United States Patent
Fritz

(10) Patent No.: US 10,982,396 B2
(45) Date of Patent: Apr. 20, 2021

(54) SLIP FORM PAVER

(71) Applicant: Wirtgen GmbH, Windhagen (DE)

(72) Inventor: Matthias Fritz, Linz (DE)

(73) Assignee: Wirtgen GmbH

( * ) Notice: Subject to any disclaimer, the term of this patent is extended or adjusted under 35 U.S.C. 154(b) by 35 days.

(21) Appl. No.: 16/508,665

(22) Filed: Jul. 11, 2019

(65) Prior Publication Data
US 2021/0010211 A1    Jan. 14, 2021

(51) Int. Cl.
*E01C 19/48*      (2006.01)
*G01S 15/08*      (2006.01)
*G01S 17/08*      (2006.01)

(52) U.S. Cl.
CPC .......... *E01C 19/4893* (2013.01); *G01S 15/08* (2013.01); *G01S 17/08* (2013.01)

(58) Field of Classification Search
CPC ....... E01C 19/4893; G01S 15/08; G01S 17/08
USPC ................................ 404/75, 84.05–84.5, 118
See application file for complete search history.

(56) References Cited

U.S. PATENT DOCUMENTS

| | | |
|---|---|---|
| 3,856,425 A | 12/1974 | Miller et al. |
| 3,936,211 A | 2/1976 | Miller et al. |
| 4,013,375 A | 3/1977 | Heaton |
| 4,093,410 A | 6/1978 | Miller |
| 4,789,266 A | 12/1988 | Clarke et al. |
| 5,984,089 A | 11/1999 | Dotson |
| 5,997,270 A | 12/1999 | Labonte |
| 6,471,442 B1 | 10/2002 | Deeb et al. |
| 6,919,070 B1 * | 7/2005 | Rudin ....................... A61K 8/24 424/400 |
| 7,172,363 B2 * | 2/2007 | Olson ................... E01C 19/006 404/118 |
| 7,753,620 B2 * | 7/2010 | Kotting ................. E01C 23/088 404/94 |
| 8,459,898 B2 | 6/2013 | Guntert, Jr. et al. |
| 8,890,046 B2 * | 11/2014 | Eul .......................... E01C 19/48 250/205 |

(Continued)

FOREIGN PATENT DOCUMENTS

| | | |
|---|---|---|
| DE | 19814052 A1 | 10/1999 |
| EP | 2813619 A1 | 12/2014 |

(Continued)

OTHER PUBLICATIONS

Miller Formless printout from www.millerforless.com, 4 pages (undated but admitted to be prior art).

(Continued)

*Primary Examiner* — Raymond W Addie
(74) *Attorney, Agent, or Firm* — Lucian Wayne Beavers; Patterson Intellectual Property Law, PC

(57) ABSTRACT

A slip form paver machine includes a slip form mold and left and right side form assemblies closing the slip form mold on the sides. Each side form assembly includes a mounting portion, a side form, and a side form actuator configured to move the side form up and down relative to the mounting portion to adjust a height of the side form relative to the ground surface. At least one side form height sensor is configured to detect the height of the side form. A controller is configured to receive input signals from the side form height sensors and to send control signals to the side form actuators to control the height of the side forms relative to the ground surface.

27 Claims, 14 Drawing Sheets

(56) References Cited

U.S. PATENT DOCUMENTS

| | | |
|---|---|---|
| 9,016,798 B2 | 4/2015 | Berning et al. |
| 9,121,141 B2 | 9/2015 | Thieme et al. |
| 9,322,139 B2 | 4/2016 | Berning et al. |
| 9,447,552 B2 | 9/2016 | Buschmann et al. |
| 10,745,867 B2 * | 8/2020 | Weber .................. E01C 19/004 |
| 2008/0031687 A1 * | 2/2008 | Frankeny ................ E04F 21/24 |
| | | 404/84.1 |
| 2013/0253780 A1 * | 9/2013 | Smieja ................... E01C 19/48 |
| | | 701/50 |
| 2016/0115654 A1 * | 4/2016 | Pedersen ................ E01C 23/07 |
| | | 404/75 |
| 2020/0208357 A1 | 7/2020 | Engels |

FOREIGN PATENT DOCUMENTS

| | | |
|---|---|---|
| EP | 3674483 A1 | 7/2020 |
| JP | 2005076338 A | 3/2005 |

OTHER PUBLICATIONS

SLIP TEC printout from www.foutsfabrication.com (2013) 2 pages.
GOMACO Variable Barrier Mold Q&A (Aug. 2000) 4 pages.
European Search Report for corresponding 20176698.7, dated Oct. 29, 2020, 7 pages (not prior art).

* cited by examiner

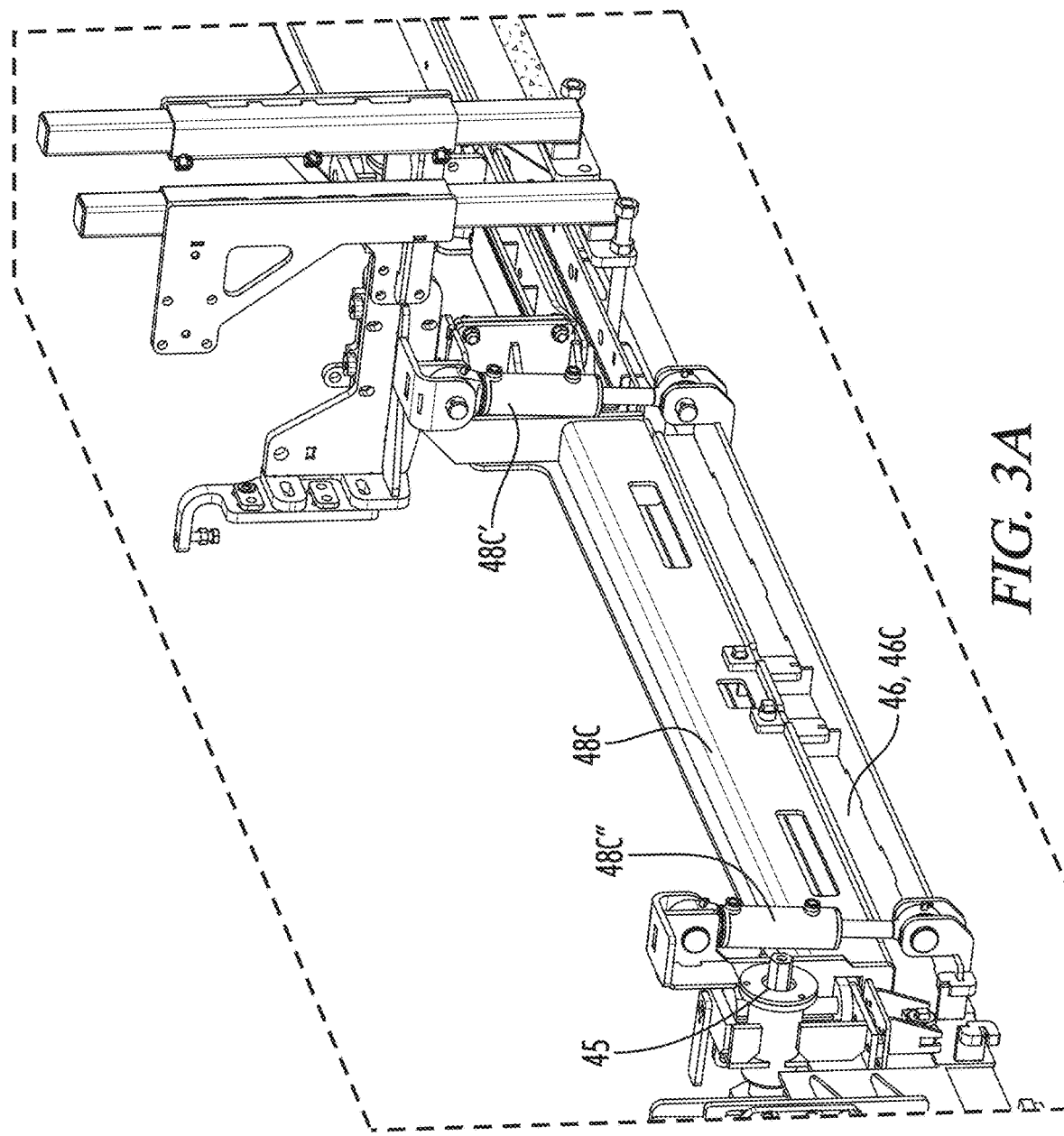

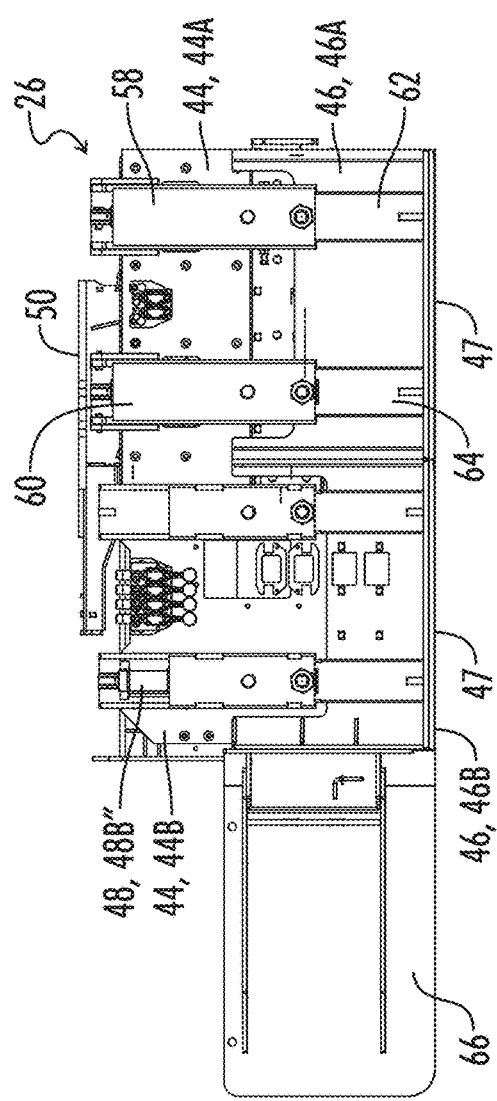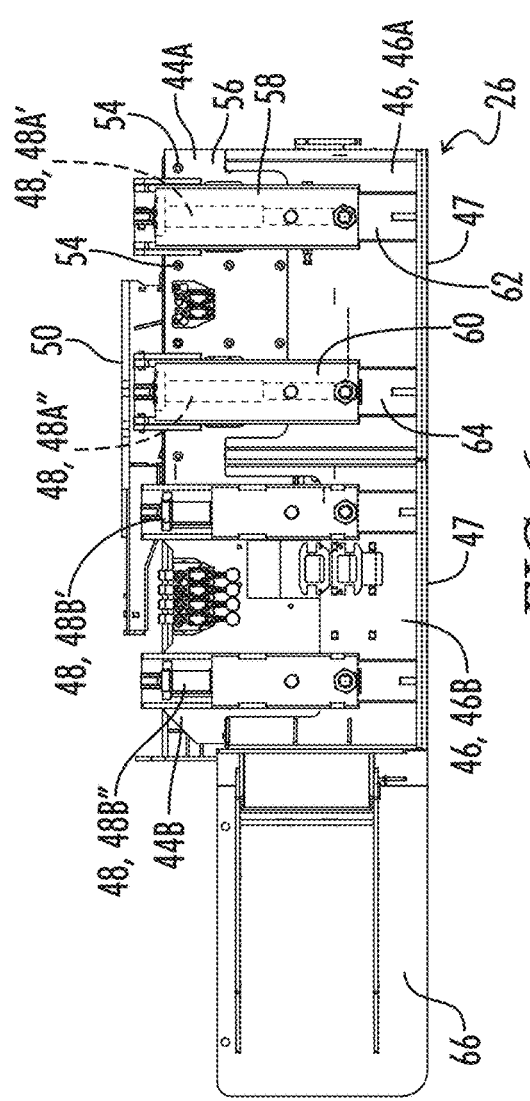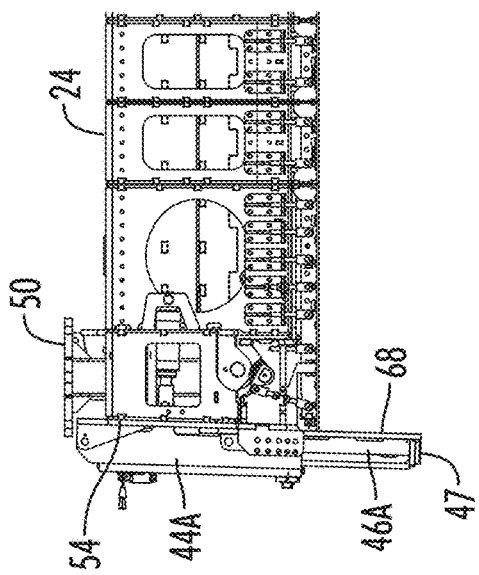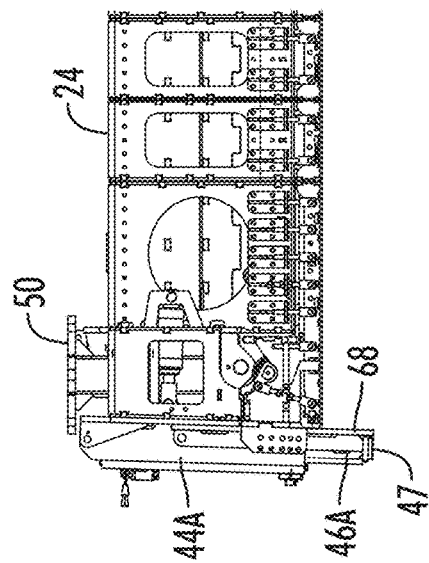

SLIP FORM PAVER

BACKGROUND OF THE INVENTION

1. Field of the Invention

The present application relates to a slip form paver apparatus, and more specifically to a side form assembly for a slip form paver apparatus providing improved control of the side form of the side form assembly.

2. Description of the Prior Art

A slip form paving machine is designed to move in a paving direction across a ground surface and form concrete into a finished concrete structure.

An inset slip form paving machine has its slip form between the tracks of the machine and is configured to spread, level and finish concrete into a slab like finished concrete structure having a finished upper surface and finished lateral sides. An offset slip form paving machine has its slip form offset to the outside of the tracks on one side of the machine and is configured such that the finished concrete structure has a profile terminating in lateral concrete sides. In either case the lateral sides are formed by side forms which extend downward relative to a slip form mold. The side forms generally are intended to slide along the ground surface to contain the concrete material between the side forms.

Various problems are encountered with the operation of existing side forms. One problem is that when traversing uneven ground the side forms may strike or dig into raised locations on the ground surface, especially if relatively high downward forces are maintained on the side form, thus disrupting a smooth slip forming operation and decreasing the quality of the finished concrete structure.

On the other hand, if the downward forces maintained on the side form are too low, the side form may not adequately perform its function of containing the concrete material and some concrete material may flow laterally out from under the side form. When this occurs it becomes difficult to return the side form to its desired position relative to the ground surface because now the slip form must be pushed down through the concrete material which has leaked out under the side form.

Thus it is important during the slip forming operation to maintain a proper downward pressure of the side forms against the ground surface in order to prevent concrete material from flowing outward under the bottom edges of the side forms, and at the same time not to exert too great of a downward pressure on the side forms because this can cause the slip forms to dig into the ground surface and can also actually raise the slip form paving machine relative to the ground surface.

The typical approach of the prior art to this problem is to have a human operator walk alongside the slip form paving machine as the paving operation is performed. This human operator observes the position of the side forms relative to the ground surface and manually adjusts the height of the side forms relative to the ground surface utilizing a plurality of control actuators provided on the slip form paving machine. The available control actuators typically allow the human operator to raise or lower the side form, and to adjust a downward force holding the side form against the ground surface. As noted, if the downward force is too low concrete material can flow laterally outward under the side form which is undesirable. To avoid that problem the human operator often applies too great a downward pressure, thus effectively lifting the paving machine and interfering with the level control systems of the paving machine resulting in a deterioration of the precision of the paving operation.

Another issue encountered with slip form paving machines is the need to periodically cycle the side forms to prevent fine concrete material from setting up in the side forms. Thus the human operator walking alongside the slip form paving machine may briefly cycle each side form up and down to break away any fine material which is setting up in the side form mechanism. But this operation again encounters the difficulty of avoiding leakage of concrete material laterally outward under the side forms.

These problems are particularly important in paving situations demanding high quality and very close tolerances on the final paved concrete structure, such as for example those situations in which modern three-dimensional paving guidance systems are used to control the paving operations.

The slip form paving machines disclosed herein provide solutions for such problems.

SUMMARY OF THE INVENTION

In one embodiment a slip form paver apparatus is configured to move in a paving direction across a ground surface for forming concrete into a finished concrete structure. The slip form paver apparatus may include a main frame, a slip form paver mold supported from the main frame, and at least one side form assembly configured to close the slip form paver mold on at least one side of the slip form paver mold to form one of the lateral concrete sides on the finished concrete structure. The at least one side form assembly may include a mounting portion supported from the slip form paver mold or from the main frame, a side form supported from the mounting portion and vertically movable relative to the mounting portion to engage the ground surface, and a side form actuator configured to move the side form up and down relative to the mounting portion to adjust a height of the side form relative to the ground surface. The apparatus may include at least one side form height sensor configured to detect directly or indirectly the height of the side form relative to the ground surface. A controller may be configured to receive an input signal from the at least one side form height sensor, and to send a control signal based at least in part on the input signal to the side form actuator to control the height of the side form relative to the ground surface.

The at least one side form height sensor may be fixed relative to the side form, such that the at least one side form height sensor is configured to directly detect the height of the side form relative to the ground surface.

Alternatively, the at least one side form height sensor may be fixed relative to the mounting portion, such that the at least one side form height sensor is configured to indirectly detect the height of the side form relative to the ground surface.

Any of the above embodiments may further include at least one side form extension sensor configured to detect a change in distance between the side form and the mounting portion.

The side form actuator may be a hydraulic piston-cylinder unit, and the at least one side form extension sensor may be integrally formed in the hydraulic piston-cylinder unit of the side form actuator. Other types of linear actuators may be used as the side form actuators.

In any of the above embodiments the at least one side form height sensor may comprise a non-contact linear scanner aligned in the paving direction and configured to detect distances between the side form and a plurality of points on the ground surface.

In any of the above embodiments the non-contact linear scanner may be a laser scanner.

In any of the above embodiments the non-contact linear scanner may include a row of ultrasonic sensors.

In any of the above embodiments the apparatus may further include an outer shield spaced laterally outward from the side form so that the non-contact linear scanner is located laterally between the side form and the outer shield, so that the non-contact linear scanner scans the ground surface between the side form and the outer shield.

In any of the above embodiments the outer shield may be configured to slide across the ground surface in a floating manner.

In another embodiment the at least one side form height sensor may comprise a probe element configured to engage the ground surface, the probe element being attached to the side form so that when the height of the side form relative to the ground surface is less than a predetermined minimum the probe element is deflected.

In any of the above embodiments the controller may include an operator interface configured such that a human operator can input a set point for the height of the side form relative to the ground surface.

In any of the above embodiments the controller may include a side form cycle mode configured such that the side form is automatically raised from and then lowered back to its previously controlled height relative to the ground surface so as to prevent concrete material from setting up against the side form.

In any of the above embodiments the side form may include at least first and second side form sections aligned in the paving direction, and the side form actuator may include first and second side form actuators associated with the first and second side form sections, respectively. The at least one side form height sensor may be associated with the first side form section. The second side form actuator may include an integrated extension sensor configured to detect an extension distance of the second side form actuator. The controller may be configured to receive input signals from the at least one side form height sensor and the integrated extension sensor of the second side form actuator, and to determine based on the input signals a height of the second side form section relative to the ground surface.

In any of the above embodiments the side form may include a third side form section aligned with the first and second side form sections, and the side form actuator may include a third side form actuator associated with the third side form section.

In any of the above embodiments the slip form paver apparatus may be an inset slip form paver apparatus configured such that the finished concrete structure has a generally upwardly exposed concrete surface and terminates in lateral concrete sides. The at least one side form assembly may be configured to form at least one of the lateral concrete sides on the finished concrete structure.

In any of the above embodiments the slip form paver apparatus may be an offset slip form paver apparatus configured such that the finished concrete structure has a profile terminating in lateral concrete sides. The at least one side form assembly may be configured to form at least a lower portion of one of the lateral concrete sides on the finished concrete structure.

In another embodiment a method of operating a slip form paver apparatus is provided. The slip form paver apparatus may include a main frame, a slip form paver mold supported from the main frame, and at least one side form assembly closing the slip form paver mold on at least one side of the slip form paver mold. The at least one side form assembly may include a mounting portion supported from the slip form paver mold or from the main frame, a side form supported from the mounting portion and vertically movable relative to the mounting portion to engage the ground surface, and a side form actuator configured to move the side form up and down relative to the mounting portion to adjust a height of the side form relative to the ground surface. The apparatus may further include at least one side form height sensor configured to detect directly or indirectly the height of the side form relative to the ground surface. The method may comprise steps of:

(a) moving the slip form paver apparatus in a paving direction across a ground surface and forming concrete into a finished concrete structure;

(b) receiving an input signal from the at least one side form height sensor in a controller, the input signal corresponding to the height of the side form relative to the ground surface; and (c) sending a control signal from the controller to the side form actuator and thereby automatically controlling the height of the side form relative to the ground surface based at least in part on the input signal.

In the above method the at least one side form height sensor may be fixed relative to the side form, and in step (b) the input signal directly corresponds to the height of the side form relative to the ground surface.

In another embodiment the at least one side form height sensor may be fixed relative to the mounting portion, and in step (b) the input signal indirectly corresponds to the height of the side form relative to the ground surface.

The method may further include steps of:

receiving in the controller an input signal from a side form extension sensor corresponding to a distance between the side form and the mounting portion; and wherein in step (c) the control signal is based at least in part on the input signal from the side form extension sensor.

In another embodiment the method may include:

the at least one side form height sensor comprising a non-contact linear scanner aligned in the paving direction; and in step (b) the input signal from the non-contact linear scanner corresponds to distances between the side form and a plurality of points on the ground surface.

The method may further include a step of shielding the non-contact linear scanner with an outer shield spaced laterally outward from the side form so that the non-contact linear scanner is located laterally between the side form and the outer shield, so that the non-contact linear scanner scans the ground surface between the side form and the outer shield.

The method may further include a step of adjusting the height of the side form relative to the ground surface to an initial height, and then step (c) may include controlling the height of the side form relative to the ground surface to maintain the initial height.

The method may further include a step of, under control of the controller, automatically raising the side form from a current height and then lowering the side form back to the current height and thereby preventing concrete material from setting up against the side form.

The side form may include at least first and second side form sections aligned in the paving direction, and the side form actuator may include first and second side form actuators associated with the first and second side form sections, respectively. The at least one side form height sensor may be associated with the first side form section, and the second side form actuator may include an extension sensor configured to detect a change in extension distance of the second side form actuator. In step (b) the controller may receive input signals from the at least one side form height sensor and the extension sensor of the second side form actuator. In step (c) the control signal may be based at least in part on the input signals from the at least one side form height sensor and the extension sensor of the second side form actuator.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 1 shows a side form assembly having one side form section like that of FIG. 10. It is noted that the terms left and right are used herein from the perspective of an operator driving the slip form paver apparatus and facing forward in the paving direction.

FIG. 3A is an enlarged view of the portion of FIG. 3 in the rectangular area identified as 3A.

FIG. 5 is a left side elevation view of the left side form assembly with the slip form in a lower or extended position.

FIG. 6 is a left side elevation view of the left side form assembly with the slip form in an upper or retracted position.

FIG. 7 is a rear elevation view of the left side form assembly of FIG. 5 as attached to a left-hand portion of the slip form paver mold, with the slip form in a lower or extended position.

FIG. 8 is a rear elevation view of the left side form assembly of FIG. 6 as attached to the left-hand portion of the slip form paver mold, with the slip form in an upper or retracted position.

DETAILED DESCRIPTION

Figure 1:
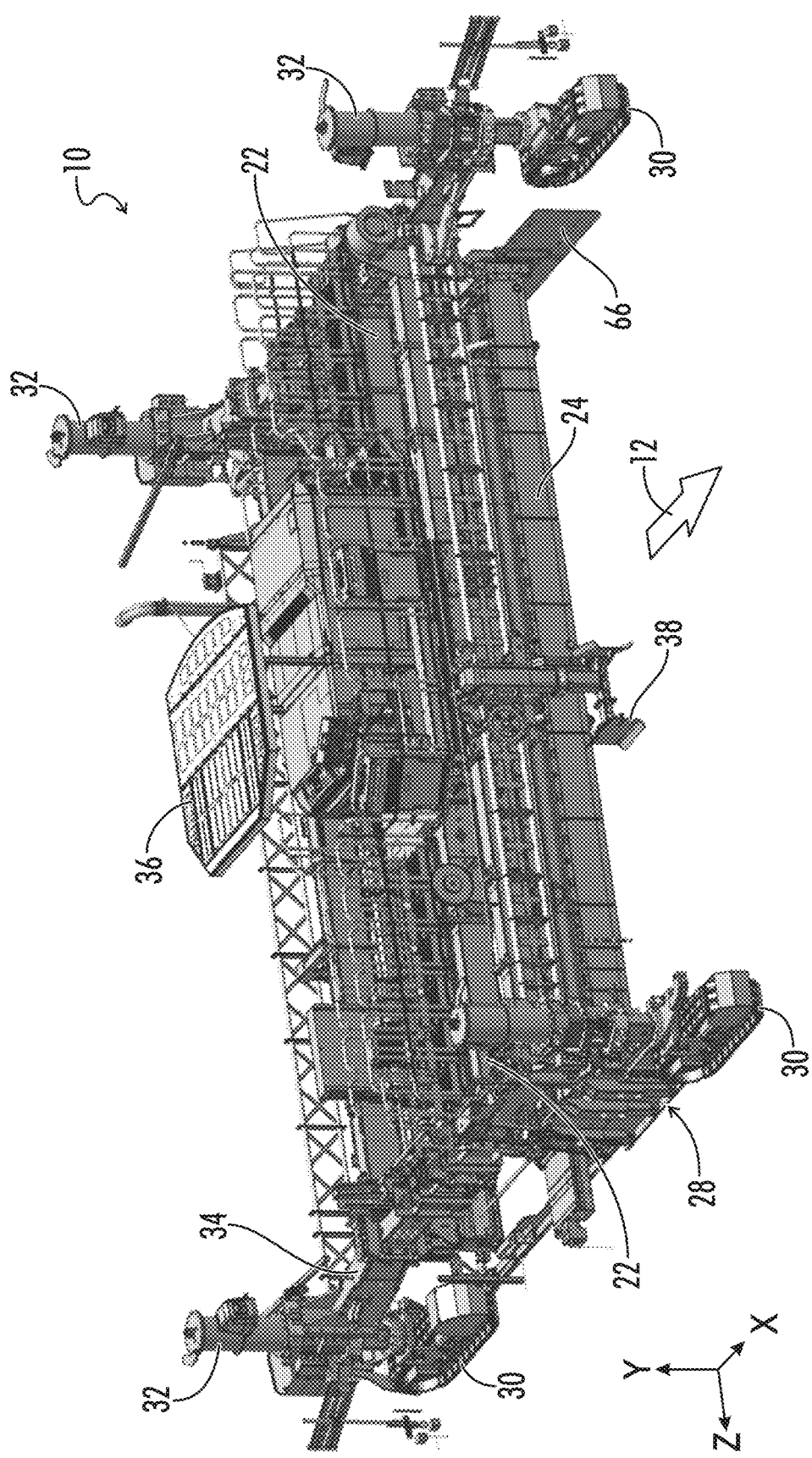
FIG. 1 is a right side front perspective view of an inset type of slip form paver apparatus.

Referring now to the drawings and particularly to FIG. 1 a slip form paver apparatus is shown and generally designated by the number 10. As is schematically illustrated in FIG. 2 the apparatus 10 is configured to move in a paving direction 12 across a ground surface 14 for spreading, leveling and finishing concrete into a finished concrete structure 16 having a generally upwardly exposed concrete surface 18 and terminating in lateral concrete sides such as 20.

The slip form paver apparatus 10 includes a main frame 22 and a slip form paver mold 24 supported from the main frame 22. Left and right side form assemblies 26 and 28 are connected to the slip form paver mold 24 to close the slip form paver mold 24 on the left and right sides to form the lateral concrete sides such as 20 of the finished concrete structure 16. The slip form paver apparatus 10 shown in FIG. 1 is an inset type slip form paver apparatus.

Figure 2:
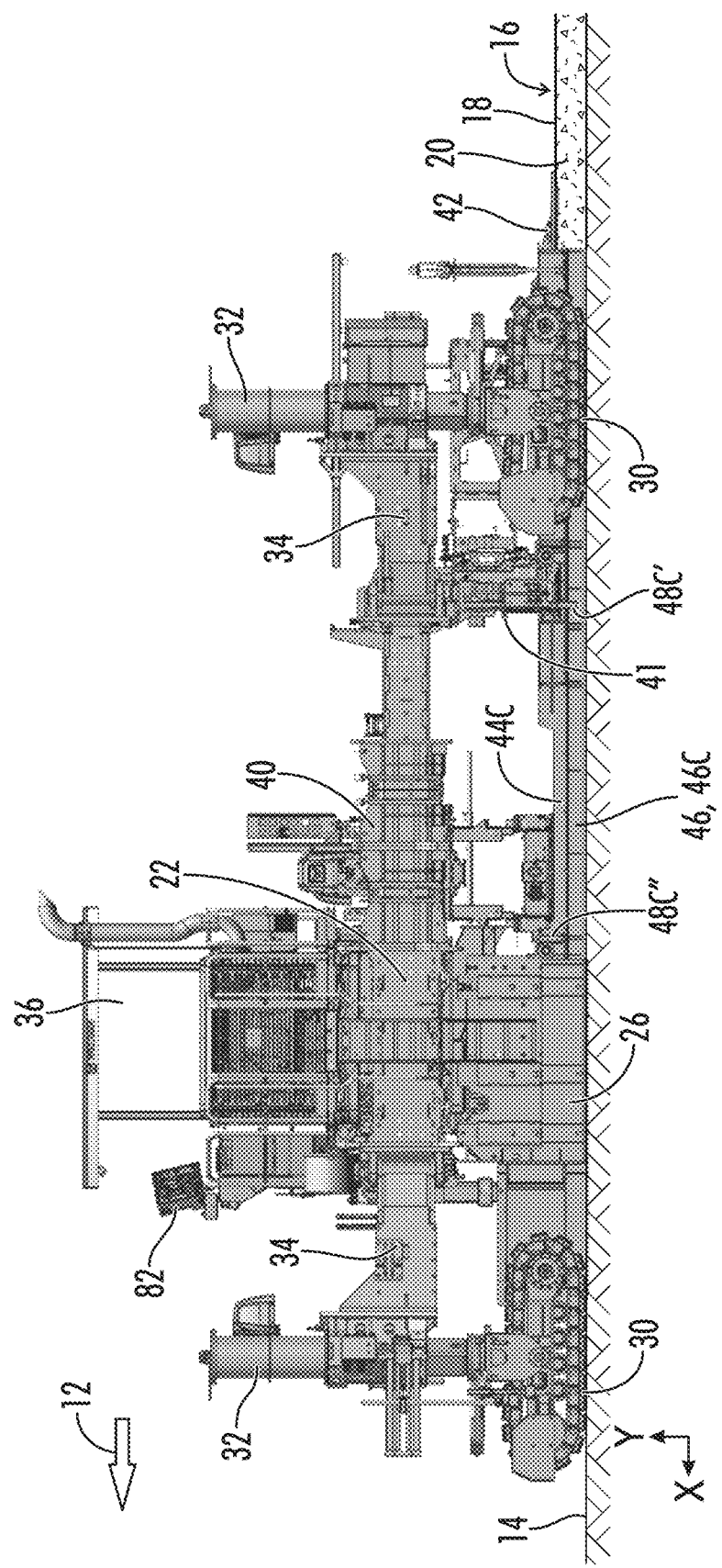
FIG. 2 is a left side elevation view of the slip form paver apparatus of FIG. 1.
Figure 9:
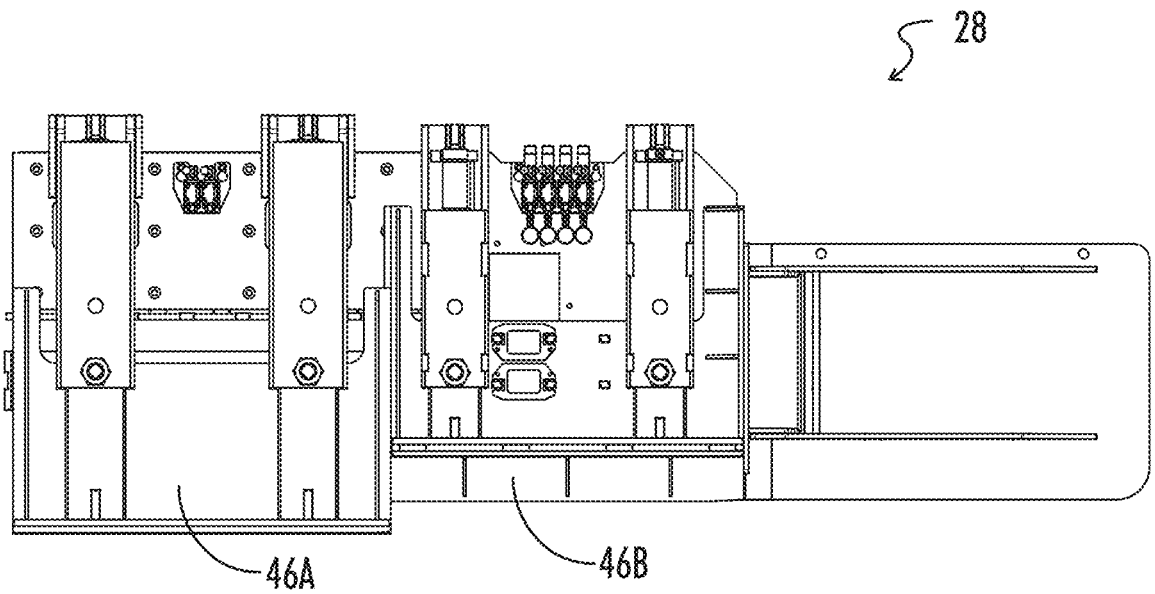
FIG. 9 is a schematic right side elevation view of a right side form assembly of the type having first and second side form sections aligned in the paving direction. The bottom edge of the first side form section is raised to a higher elevation than the second side form section.
Figure 10:
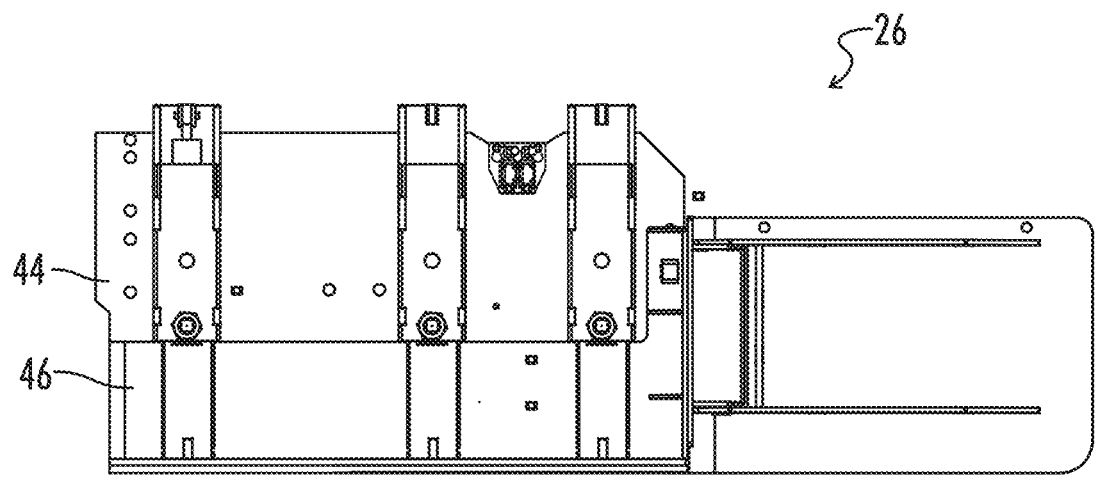
FIG. 10 is a schematic right side elevation view of an alternative embodiment of a right side form assembly of the type having only one side form section.

The left and right side form assemblies 26 and 28 shown in FIGS. 1 and 2 are of the single side form section type as is shown in further detail in FIG. 10. Alternatively the paving machine 10 may utilize side form assemblies of the multiple side form section type as shown in further detail in FIGS. 3-9.

The main frame 22 is supported from the ground surface by a plurality of ground engaging units such as 30, which in the illustrated embodiment are tracked ground engaging units 30. Each of the ground engaging units 30 is connected to the main frame 22 by a lifting column such as 32 which is attached to a swing arm such as 34. As seen in FIGS. 1 and 2 there are two front ground engaging units 30 and two front lifting columns 32 supporting the main frame 22 from the front ground engaging units. There are also two rear ground engaging units 30 and two rear lifting columns 32 supporting the main frame 22 from the rear ground engaging units. The slip form paver mold 24 is supported from the main frame 22 behind the front ground engaging units and forward of the rear ground engaging units. An operator's platform 36 is located on the main frame 22. A plow or spreader device 38 is supported from the main frame 22 ahead of the slip form paver mold 24. Behind the slip form paver mold 24 a dowel bar inserter apparatus 40 may be provided. Behind the dowel bar inserter apparatus 40 an oscillating beam 41 and a super smoother apparatus 42 may be provided.

Referring now to FIG. 5 a left side elevation view is shown of a left side form assembly 26 of the two side form section type in an extended or lower position wherein the side form of the side form assembly engages the ground surface 14. The details of description of the left side form assembly 26 will be given here, it being understood that the right side form assembly 28 is constructed in a substantially identical manner.

The side form assembly 26 includes a mounting panel 44 supported from the slip form paver mold 24. The mounting panel 44 may also be referred to as a mounting portion. The slip form paver mold 24 may be fixedly attached to the main frame 22 by bolting upward facing flanges such as 50 to the main frame 22. The mounting panel 44 may be attached to the slip form paver mold 24 by a plurality of bolts or other fasteners such as 54 (see FIG. 7). Alternatively, the mounting panel 44 may be supported directly from the main frame 22.

The side form assembly 26 further includes a side form 46 supported from the mounting panel 44 and vertically movable relative to the mounting panel 44 to engage the ground surface 14.

At least one side form actuator 48 extends between the mounting panel 44 and the side form 46 to move the side form 46 up and down relative to the mounting panel 44 to adjust a height of the side form 46 relative to the ground surface 14.

In the embodiment illustrated in FIGS. 5 and 6 the side form 46 includes first and second side form sections 46A and 46B aligned in the paving direction, and the side form actuator 48 includes first and second side form actuators 48A and 48B associated with the first and second side forms 46A and 46B, respectively. The first side form actuator 48A may include a pair of hydraulic piston-cylinder actuators 48A' and 48A". Similarly, the second side form actuator 48B may include a pair of hydraulic piston-cylinder actuators 48B' and 48B". The side form 46 may include more that two side form sections aligned in the paving direction. Each side form section may be individually controlled by its associated side form actuators.

Although the side form actuators 48 are shown as hydraulic piston-cylinder units, any other suitable actuator type may be used. For example, the actuators 48 may be other types of linear actuators, including hydraulically or electrically powered lead screws, electrically or hydraulically powered rack and pinion, pneumatic actuators, or the like.

The mounting panel 44, in the illustrated embodiment, includes first and second mounting panel sections 44A and 44B each individually bolted to the slip form paver mold 24. In the illustrated embodiment the first and second side form sections 46A and 46B are connected to the mounting panel sections 44A and 44B, respectively.

The first mounting panel section 44A includes a vertical plate portion 56 and two outer box frames 58 and 60 welded to or otherwise fixed to the vertical plate portion 56. The first side form section 46A includes first and second inner box frames 62 and 64 received within the outer box frames 58 and 60, respectively, so as to guide the vertical motion of the first side form section 46A relative to the first mounting panel section 44A. The two actuators 48A' and 48A" may be received in the interiors of the outer box frames 58 and 60 and the inner box frames 62 and 64.

Thus the first side form section 46A may be raised and lowered relative to the first mounting panel section 44A by the two actuators 48A' and 48A". Similarly, the second side form section 46B may be raised and lowered relative to the second mounting panel section 44B by extension and retraction of the side form actuators 48B' and 48B".

A guide panel 66 is attached to and extends forward from the second side form section 46B. The guide panel 66 guides unformed concrete material into the path of the slip form paver mold 24.

As is best seen in FIG. 7 and FIG. 8 the first side form section 46A has a smooth inner surface 68 which forms the lateral concrete side 20 of the finished concrete structure 16.

Figure 3:
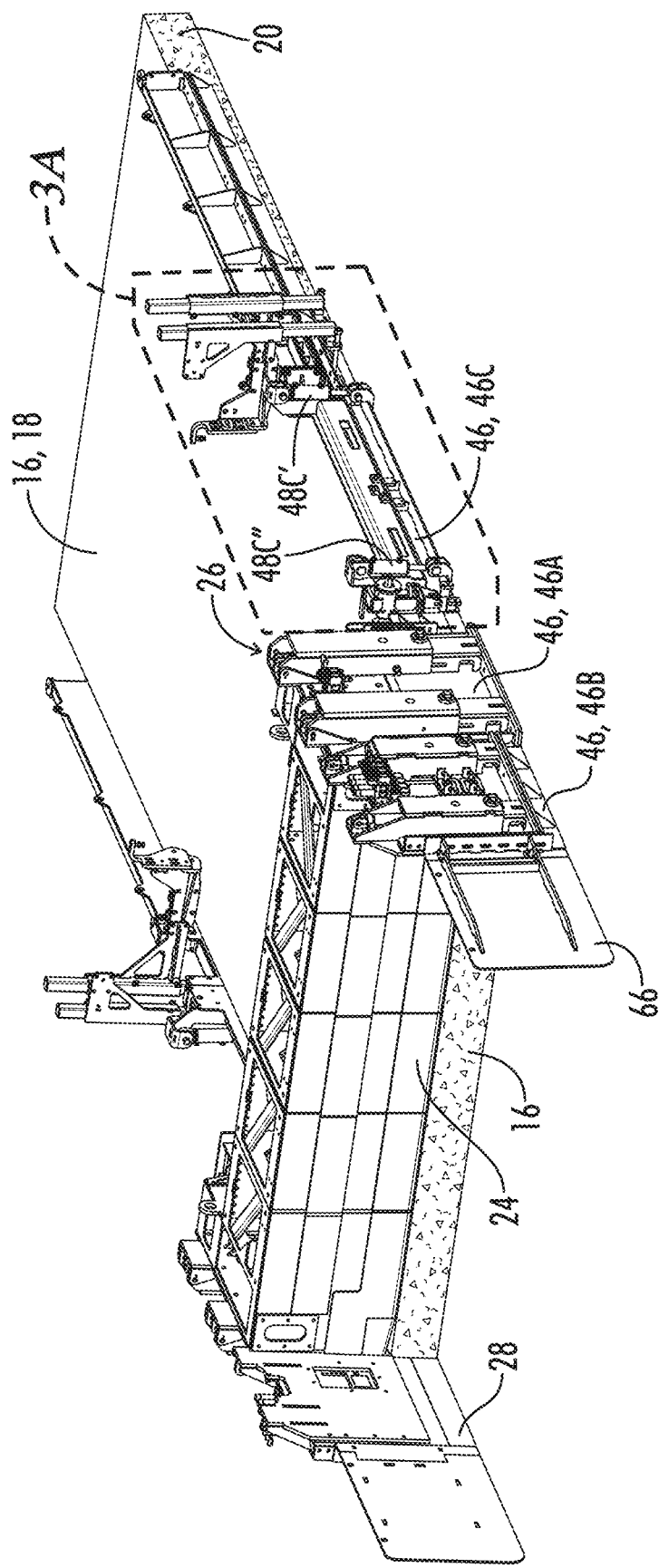
FIG. 3 is a left side front perspective view of a slip form paver mold and left and right side form assemblies of the two section type like that of FIGS. 4-9.
Figure 4:
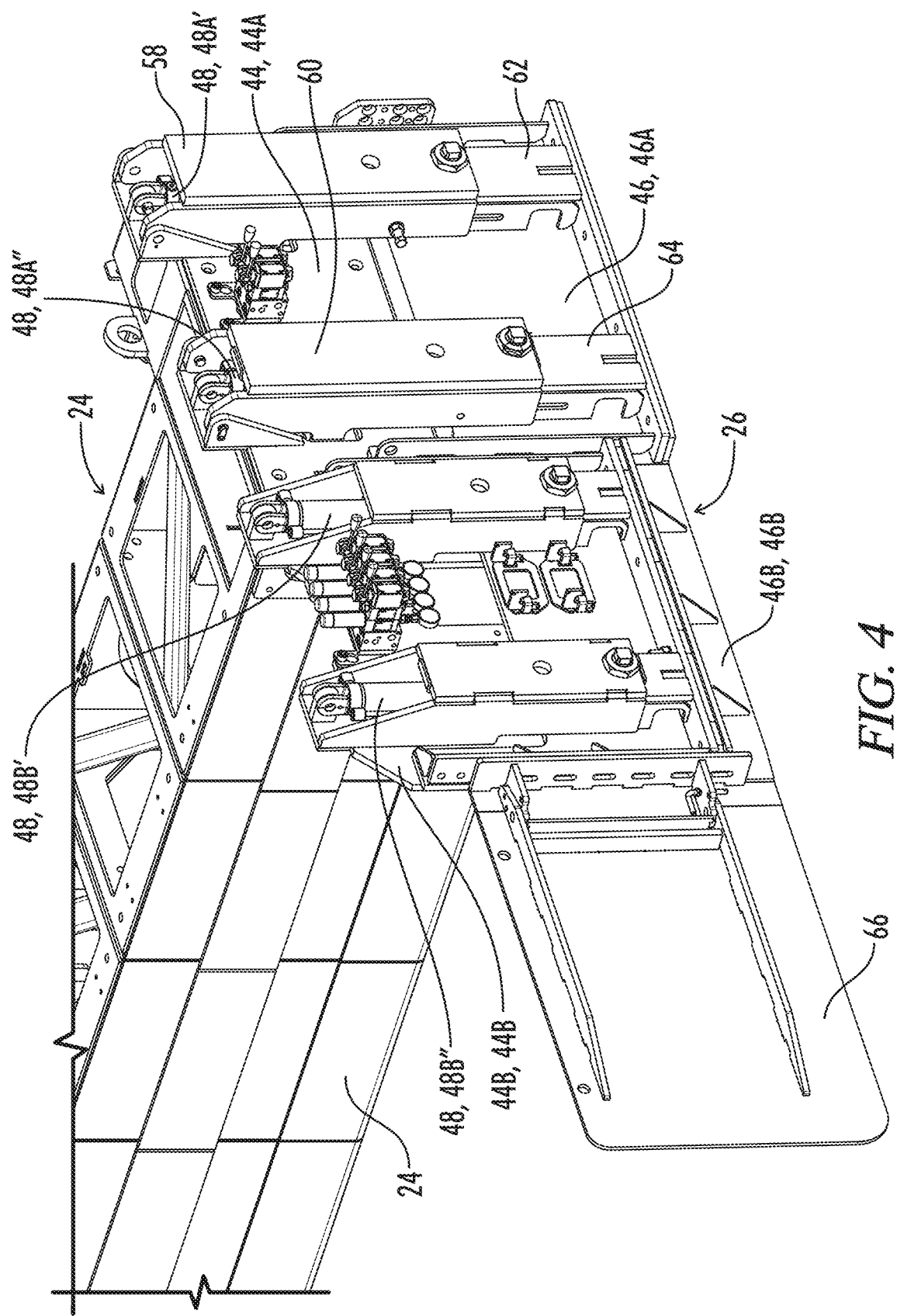
FIG. 4 is an enlarged view of the left side form assembly as attached to the slip form paver mold of FIG. 3.
Figure 17:
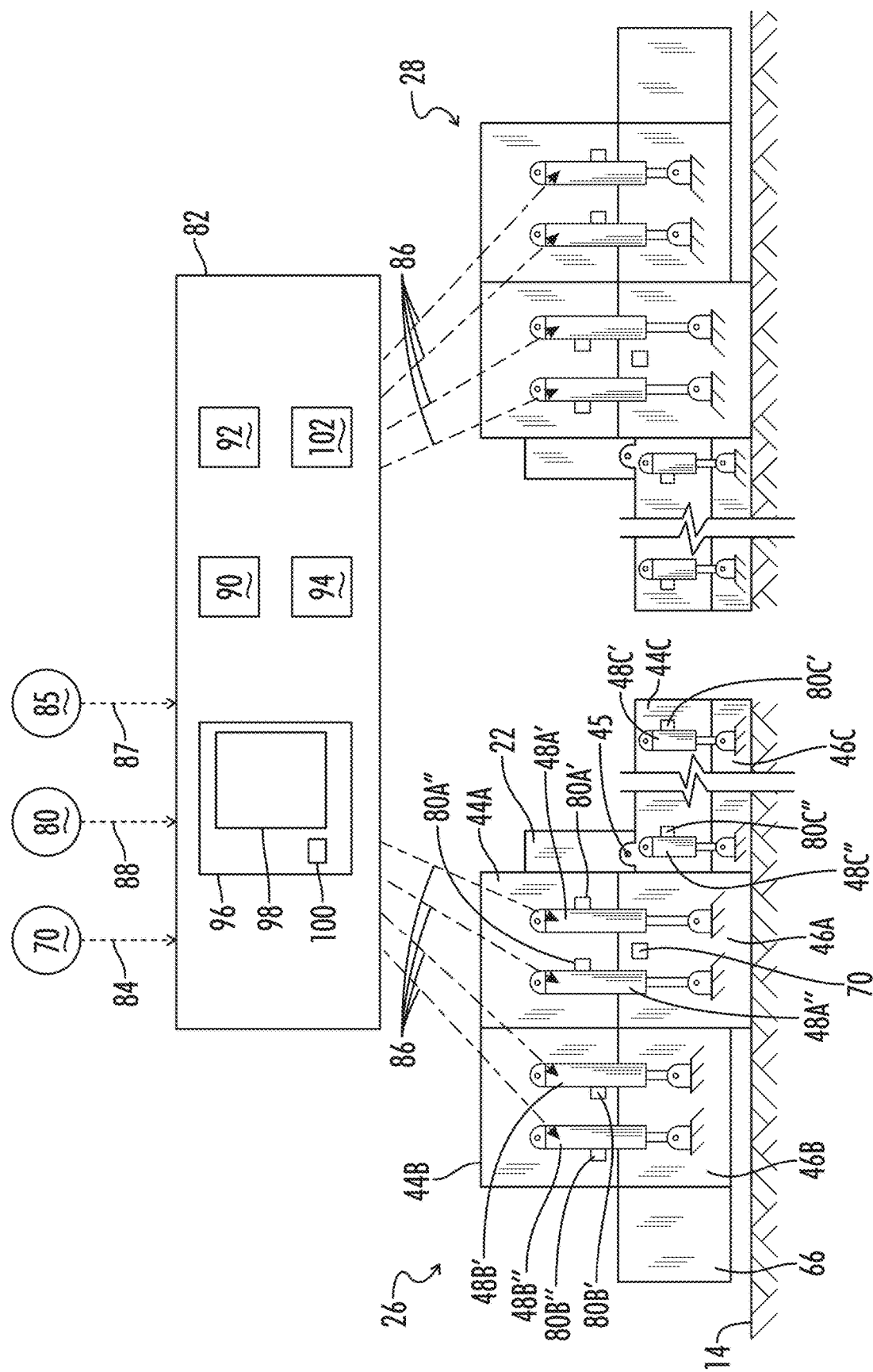
FIG. 17 is a schematic illustration of a controller with the associated input sensors and the output signals to the associated actuators.

As seen in FIG. 3, and schematically in FIG. 17, the left side plate assembly 26 may further include a third side form section 46C in the form of a drag side form or trailing side form. The third side form section 46C is adjustable in height relative to a mounting portion 44C via two actuators 48C' and 48C" which may include integrated extension sensors 80C' and 80C". The mounting portion 44C may be pivotally connected to the main frame 22 at a pivotal connection 45.

FIG. 9 shows a right side elevation perspective view of the right side plate assembly 28 which is constructed in the same manner as the left side plate assembly 26 of FIG. 5 and FIG. 6. As schematically illustrated in FIG. 9 this allows one of the side form sections such as side form section 46B to be raised relative to the other side form section 46A.

FIG. 10 is a schematic right side front perspective view of an alternative embodiment of a right side form assembly of the type having only one side form section as is also shown in FIGS. 1 and 2.

Figure 11:
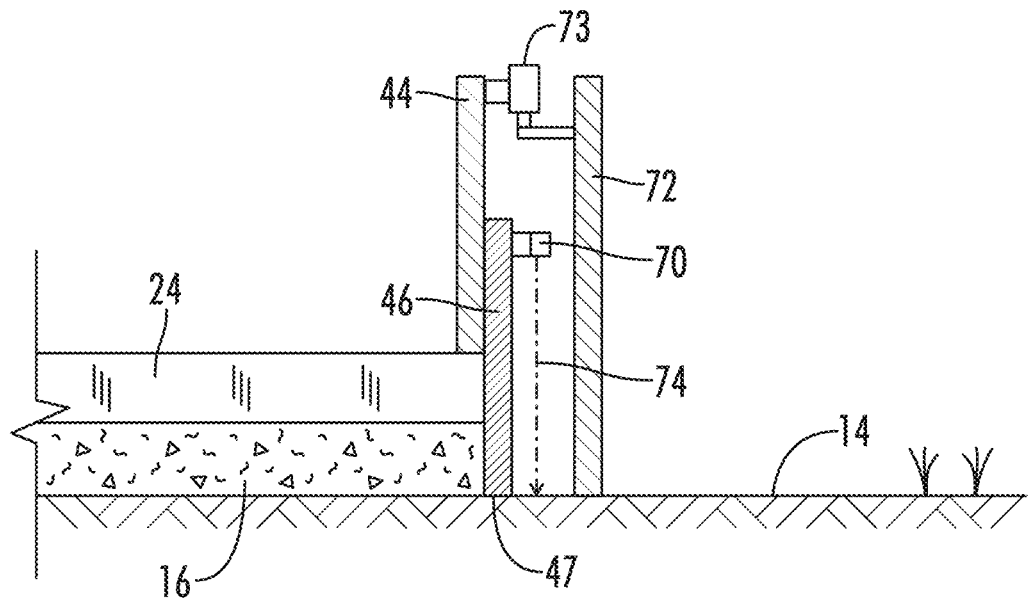
FIG. 11 is a schematic cross-section front elevation view of a side form and a non-contact linear scanner attached to the side form and scanning the ground surface between the side form and an outer shield.
Figure 12:
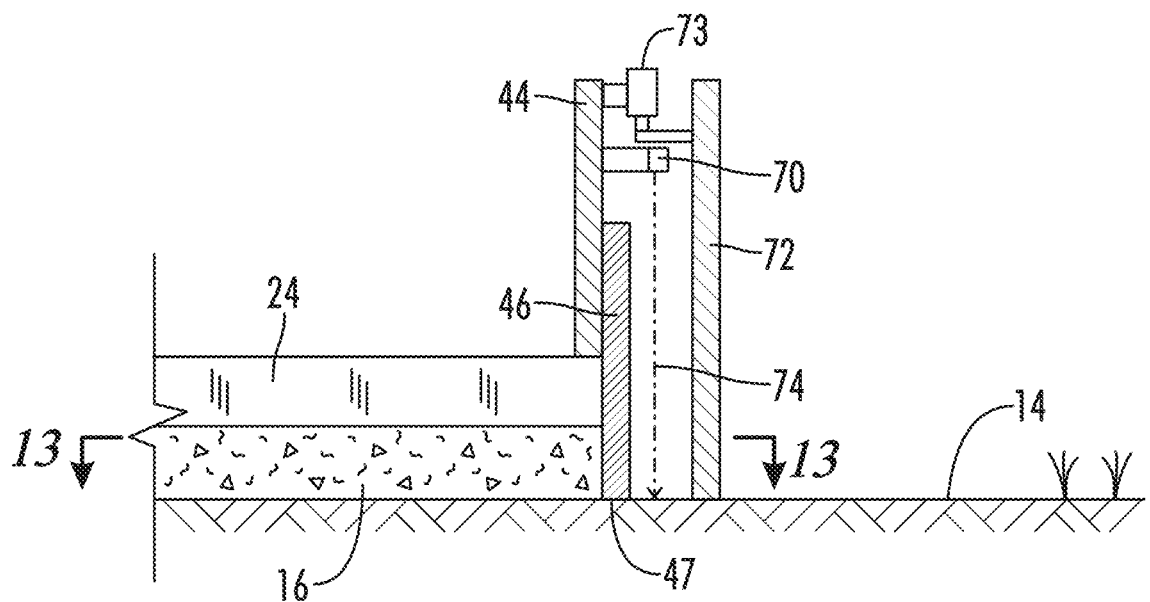
FIG. 12 is a schematic cross-section front elevation view similar to FIG. 11 but with the non-contact linear scanner attached to the mounting portion.

As schematically illustrated in FIGS. 11 and 12, apparatus 10 further includes at least one side form height sensor 70 configured to detect directly or indirectly a height of the side form 46 relative to the ground surface 14.

FIG. 11 schematically illustrates one embodiment wherein the side form height sensor 70 is fixed relative to the side form 46, such that the side form height sensor 70 is configured to directly detect the height of the side form 46 relative to the ground surface 14.

FIG. 12 schematically illustrates a second embodiment in which the side form height sensor 70 is fixed relative to the mounting panel 44 such that the side form height sensor 70 is configured to indirectly detect the height of the side form 46 relative to the ground surface 14. This is referred to as an indirect method because in addition to the information from the side form height sensor it is necessary to have information of the position of the side form 46 relative to the mounting panel 44. Although FIG. 12 shows the side form height sensor 70 mounted on the mounting panel 44, it will be understood that the side form height sensor 70 could also be mounted on the main frame 22 or any other structure fixed relative to the mounting panel 44, and the side form height sensor 70 would still be fixed relative to the mounting panel 44.

It will be understood that when the side form height sensor 70 is described as being configured to detect a height of the side form 46 relative to the ground surface 14, it is not required that the sensor 70 detect the height of any particular part of the side form 46 relative to the ground surface. And it is not required that the sensor actually quantitatively measure the detected height. The sensor 70 will generate a signal that may be representative of a height, or of a change in height, of the sensor relative to the ground surface. The position of the sensor relative to the entirety of the side form 46 will be geometrically known, and the position of any point on the side form 46 relative to the ground surface may then be determined as needed.

One height of the side form 46 that may be detected is the relative position of a bottom surface 47 of the side form 46 relative to the ground surface. This bottom surface 47 is typically a wide surface somewhat like a ski. As is further described below, the position of the side form 46 may be controlled so that the bottom surface engages the ground surface 14 but is not forced downward into the ground surface 14.

In the embodiments of both FIGS. 11 and 12, the side form height sensor 70 comprises a non-contact linear scanner aligned in the paving direction 12 and configured to detect distances between the side form 46 and a plurality of points along the ground surface 14. Additionally, in the embodiments of both FIGS. 11 and 12 an outer shield 72 is schematically shown as spaced laterally outward from the side form 46 so that the non-contact linear scanner 70 is located laterally between the side form 46 and the outer shield 72. This allows the non-contact linear scan to scan the ground surface 14 between the side form 46 and the outer shield 72. A linear scanner is superior to a single point sensor because it avoids reaction to relatively small discontinuities in the ground surface 14.

The outer shield 72 is schematically illustrated as being supported from the mounting panel 44. Preferably the outer shield 72 is supported from the mounting panel 44 in a floating manner. This may be accomplished for example by connecting the outer shield 72 to the mounting panel 44 with vertically oriented hydraulic actuators represented schematically at 73, which may be set in a floating mode. Thus the outer shield 72 may slide across the ground surface 14 in the paving direction 12 in a floating manner so that the outer shield 72 generally engages the ground surface 14 without digging into the ground surface 14. Alternatively, the outer shield 72 may be fixed to the side form 46 so as to move up and down with the side form 46.

The outer shield 72 serves to protect the side form height sensor 70 from interference by outside instrumentalities, whether they be debris or even a human operator straying into the path of the side form height sensor 70. Thus a scanning beam 74 from the side form height sensor 70 may scan the ground surface 14 between the side form 46 and the outer shield 72.

Figure 13:
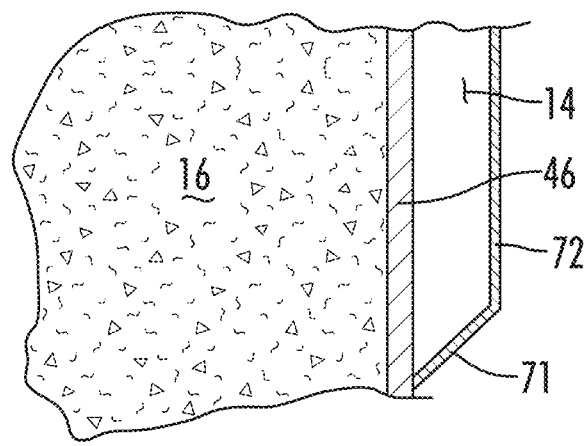
FIG. 13 is a plan view of the apparatus of FIGS. 11 and 12, taken along line 13-13 of FIG. 12.

As schematically shown in the plan view of FIG. 13 a forward end portion 71 of the outer shield 72 may extend toward or to the side form 46 to provide a plow or debris sweeping function ahead of that portion of the ground surface 14 being scanned by the side form height sensor 70.

Figure 14:
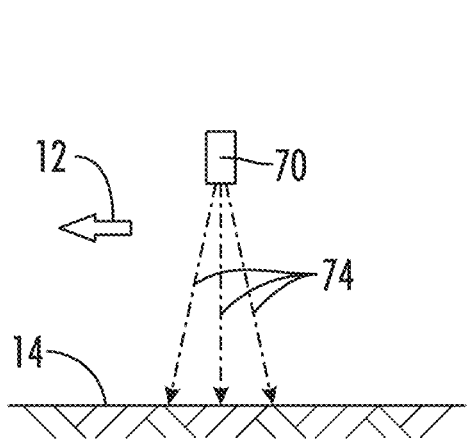
FIG. 14 is a schematic side elevation view of a laser scanner type of non-contact linear scanner.

One technology which may be used for the non-contact linear scanner 70 is a laser scanner. Such scanners can measure the distance to objects in at least two different ways. One type of laser scanner uses triangulation methods to measure distances. One suitable laser profile scanner of the triangulation type is the LPS 36 Laser Measurement System available from Leuze electronic GmbH & Co. KG of Owen, Germany. Another type of laser scanner directly measures distances using time-of-flight of reflected signals. One commercially available scanner of the time-of-flight type is the LMS100 Laser Measurement System available from Sick, AG of Waldkirch, Germany. A scanner 70 using a laser scanner technology is schematically illustrated in side view in FIG. 14.

Still another type of non-contact linear scanner is a CCD camera sensor. Using a CCD camera sensor the profile may be detected using an algorithm parsing the image recorded by the CCD camera.

Still another type of non-contact linear scanner is a Photonic Mixing Elements (PMD) device which provides 3D imagery using time of flight PMD sensors.

Figure 15:
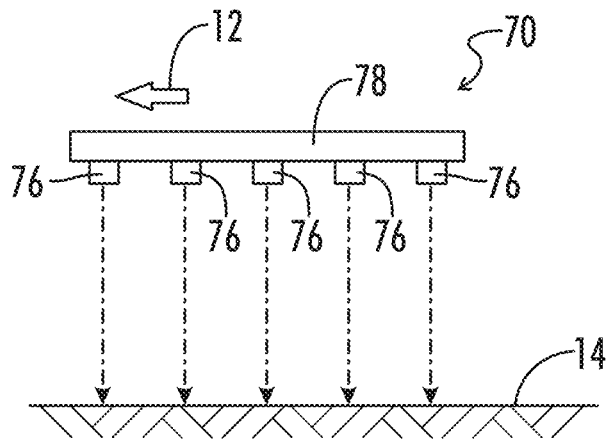
FIG. 15 is a schematic side elevation view of an ultrasonic type of non-contact linear scanner.

Still another type of non-contact linear scanner includes a row of ultrasonic sensors. A side form height sensor 70 using ultrasonic sensors is schematically illustrated in side view in FIG. 15. A plurality of ultrasonic sensors 76 are mounted along a mounting bar 78 which is connected either to the side form 46 as shown in FIG. 11 or the mounting panel 44 as shown in FIG. 12.

With any of the above types of sensors, when using the embodiment of FIG. 11 with the side form height sensor 70 fixed relative to the side form 46, a signal generated by the side form height sensor 70 may be directly representative of the height of the side form 46 relative to the ground surface 14 or of a change in that height. However, when using the embodiment of FIG. 12 with the side form height sensor 70 fixed relative to the mounting panel 44 and thus fixed relative to the main frame 22, the signal generated by the side form height sensor 70 can be described as indirectly representing the height or change in height of the side form 46. In order to determine the actual height or actual change in height of the side form 46 relative to the ground surface 14, it is also necessary to know the position of the side form 46 relative to the mounting panel 44. The position of the side form 46 relative to mounting panel 44 is preferably determined utilizing at least one side form extension sensor 80. The side form extension sensor 80 may for example be integrally formed in the hydraulic piston-cylinder unit of the side form actuator 48 in the manner of what is often referred to as "smart cylinder". As previously noted the side form actuator 48 may be another type of actuator other than a hydraulic piston-cylinder unit. Any of these types of side form actuators 48 may include integrated extension sensors 80, or they may include separate extension sensors 80 operably associated with the side form actuators 48.

Figure 16:
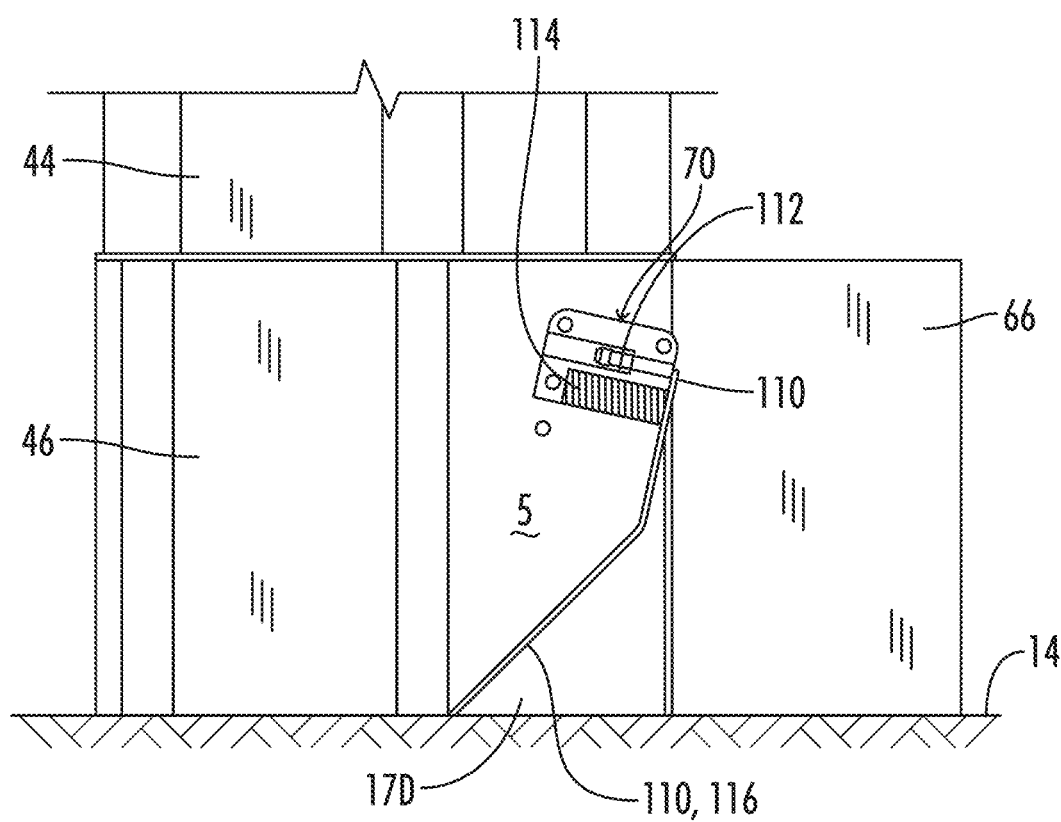
FIG. 16 is a schematic illustration of an alternative embodiment utilizing a probe element as the side form height sensor.

Alternative Embodiment of FIG. 16

FIG. 16 illustrates an alternative embodiment in which the side form height sensor 70 comprises a probe element 110 configured to engage the ground surface 14. The probe element type side form height sensor 70 is attached to the side form 46 so that when the height of side form 46 relative to the ground surface 14 is less than a predetermined minimum the probe element 110 is deflected. A probe element type of height sensor 70 may for example be useful when the ground surface being paved is a relatively hard surface, for example a previously paved surface.

In the embodiment of FIG. 16 the probe element 110 is a resilient element connected to a preferably inductive or capacitive proximity switch 112. The resilient probe element includes a helical tension spring 114. The probe element 110 includes a lower end portion 116 extending toward the ground surface 14. The probe element 110 senses the ground surface 14 with the lower end portion 116. During operation of the slip form paving machine 10 the side form 46 slides across the ground surface 14, with the probe element 110 sliding on or just above the ground surface 14. In doing so, a predetermined distance is defined between the side form 46 and the ground surface 14. If the side form 46 digs into the ground surface 14 this distance decreases so that the probe element 110 is deflected and the proximity switch 112 is actuated.

The Controller of FIG. 17

As schematically illustrated in FIG. 17, the apparatus 10 includes a controller 82 configured to receive an input signal 84 from the side form height sensors 70, and configured to send control signals as indicated at 86 to the side form actuators 48 to control the height of the side forms 46 relative to the ground surface 14. The control signals 86 are based at least in part on the input signals 84 from the side form height sensors 70. The controller 82 may be part of the machine control system of the slip form paver apparatus 10, or it may be a separate control module. The controller 82 may be mounted in the operators cab 36. Optionally the controller 82 may be mounted as part of the slip form paver mold 24 to be accessible by a ground based human operator.

It will be understood that when reference is made herein to side forms 46 this may include any one or more of the side forms 46A, 46B or 46C described herein. When reference is made herein to the actuators 48 this may include any one or more of the actuators 48A', 48A", 48B', 48B", 48C' or 48C" described herein. When reference is made to sensors 70 this may include the sensors 70 associated with any one or more of the side forms 46 described herein. When reference is made to extension sensors 80 this may include any one or more of the extension sensors 80A', 80A", 80B', 80B", 80C' or 80C" described herein. When reference is made to command signals 86 this may include the command signals 86 associated with any one or more of the actuators 48 described herein.

The controller 82 receives input signals from the side form height sensors 70 and from the side form extension sensors 80. The controller 82 may also receive other signals indicative of various functions of the slip form paving machine 10. The signals transmitted from the various sensors to the controller 82 are schematically indicated in FIG. 17 by phantom lines connecting the sensors to the controller with an arrowhead indicating the flow of the signal from the sensor to the controller 82.

Similarly, the controller 82 will generate command signals 86 for controlling the operation of the various actuators, which command signals are indicated schematically in FIG. 17 by phantom lines connecting the controller 82 to the various actuators with the arrow indicating the flow of the command signal from the controller 82 to the respective actuator. It will be understood that the various actuators as disclosed herein may be hydraulic piston-cylinder units and that the electronic control signal from the controller 82 will actually be received by an electro-hydraulic control valve associated with the actuator and the electro-hydraulic control valve will control the flow of hydraulic fluid to and from the hydraulic actuators to control the actuation thereof in response to the command signal from the controller 82.

Furthermore, the controller 82 may control the direction of travel of the slipform paving machine 10 by steering of the ground engaging units 30 via a conventional steering system (not shown). Communication of such steering signals from the controller 82 to the various steered ground engaging units is performed in a conventional manner.

Controller 82 includes or may be associated with a processor 90, a computer readable medium 92, a data base 94 and an input/output module or control panel 96 having a display 98. An input/output device 100, such as a keyboard or other user interface, is provided so that the human operator may input instructions to the controller. It is understood that the controller 82 described herein may be a single controller having all of the described functionality, or it may include multiple controllers wherein the described functionality is distributed among the multiple controllers.

The input/output device 100 provides an operator interface configured such that a human operator can input a set point for the height of the side form 46 relative to ground surface 14. In one mode of operation the human operator may set up the slip form paving machine 10 by manually adjusting the position of each of the side forms 46 to an initial height relative to the ground surface 14, then inputting the current positions of the side forms as set points or zero points to the controller 82. The controller 82 may be configured to then control the heights of the side forms to the set points. It will be understood that for side forms 46 having multiple side form sections such as 46A and 46B, each side form section may have a different set point.

The initial height of the side form 46 relative to the ground surface 14 may be a height where the bottom surface 47 of the side form 46 engages the ground surface 14 but is not forced downward into the ground surface 14. As noted such a position may be visually selected by the human operator as the set point for the height during set up of the slip form paving machine. The subsequent control of the side form actuators 48 via command signals 86 may be based at least in part on the input signals 84 from the side form height sensors 70.

The command signals 86 may also be based in part on pressure input signals 87 representative of hydraulic pressure in the side form actuators 48, for example to limit the hydraulic pressure to prevent lifting of the slip form paving machine 10 relative to the ground surface 14. Such pressure input signals 87 may be generated by pressure sensors 85 associated with the side form actuators 48. It will be appreciated that control of the side form actuators at least in part based upon input signals 84 from the side form height sensors 70 is superior to any control that could be accomplished solely based on monitoring of pressure in the side form actuators 48. Although ideally it might be desirable to optimize the pressure applied by the side forms 46 to the ground surface 14, such an optimized pressure changes based upon changing ground conditions of the ground surface 14.

Various operations, steps or algorithms as described in connection with the controller 82 can be embodied directly in hardware, in a computer program product 102 such as a software module executed by the processor 90, or in a combination of the two. The computer program product 102 can reside in RAM memory, flash memory, ROM memory, EPROM memory, EEPROM memory, registers, hard disk, a removable disk, or any other form of computer-readable medium 92 known in the art. An exemplary computer-readable medium 92 can be coupled to the processor 90 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Also, when using the side form 46 of FIG. 5, as further schematically represented in FIG. 17, including first and second side form sections 46A and 46B aligned in the paving direction 12, the side form height sensor 70 may for example be associated with the first side form section 46A, and then an integrated extension sensor 80 in the side form actuator 48B for the second side form section 46B can be used to detect an extension distance of the second side form actuator 48B and thus of the second side form section 46B. Extension signals 88 from extension sensors 80 are received by controller 82. The controller 82 may receive input signals from both the side form height sensor 70 associated with the first side form section 46A and from the integrated extension sensor 80 associated when the second side form actuator 48B of the second side form section 46B to determine based on both input signals a height of the second side form section 46B relative to the ground surface 14.

As noted, one problem typically encountered with slip form paving machines is that the movable side forms may become stuck relative to their respective mounting panels 44 because the fine concrete material being handled may find its way into small spaces between the moving parts and may set up thus making further movement of the side form difficult. To avoid this problem it is necessary to periodically cycle the side form through an up and down movement so as to break loose concrete material which is in the process of setting up. In one embodiment of the disclosed apparatus the controller 82 includes a side form cycle mode configured such that the side form 46 is automatically raised from and then lowered back to its previously controlled height relative to the ground surface 14 so as to prevent concrete material from setting up between the mounting panel and the side form. The up and down stroke for this cycle mode may for example be on the order of 5 to 10 mm movement of the side form. Use of the side form cycle mode providing height control based upon detected height of the side form 46 relative to the ground surface allows the side form 46 to be returned to the desired height even if it must be pushed downward through a layer of concrete material which has flowed laterally outward under the side form lower surface 47 while the side form 46 was raised.

Figure 18:
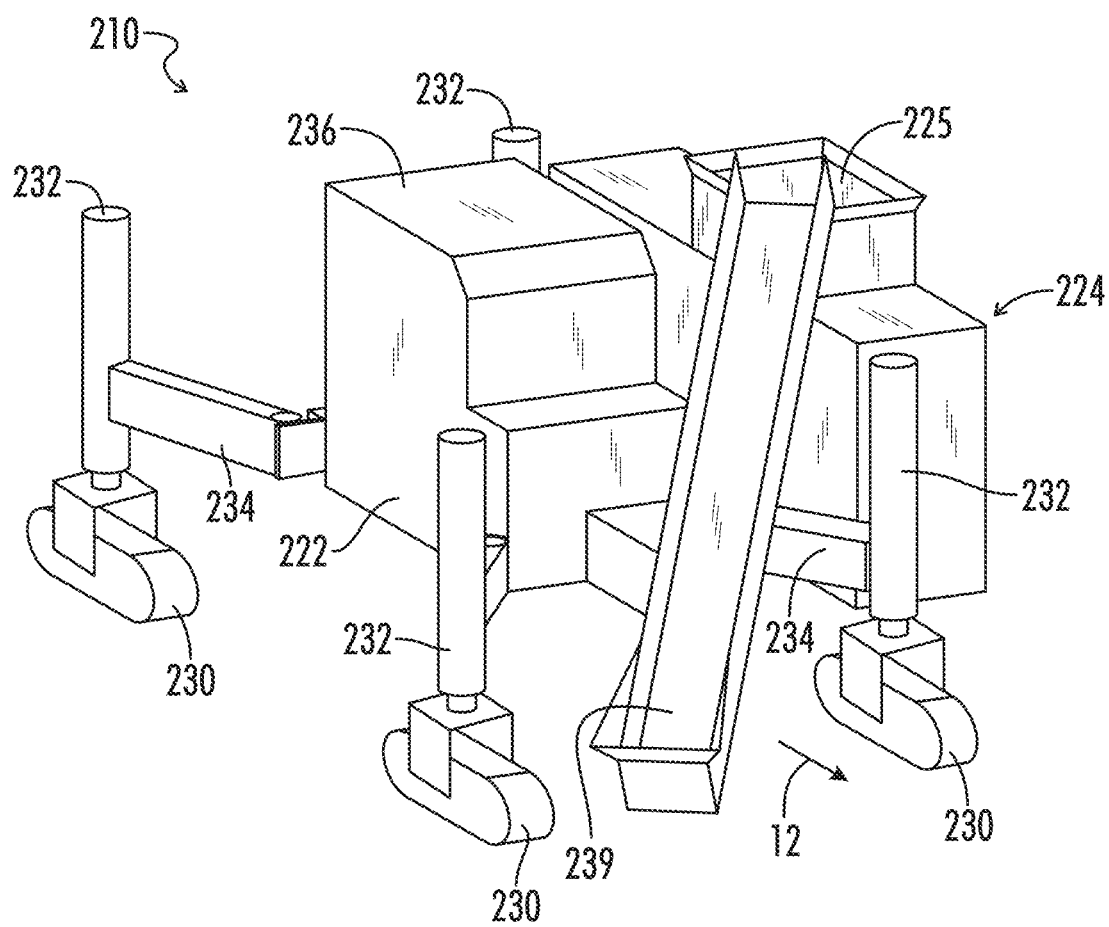
FIG. 18 is a schematic front right perspective view of an offset type of slip form paver apparatus.
Figure 19:
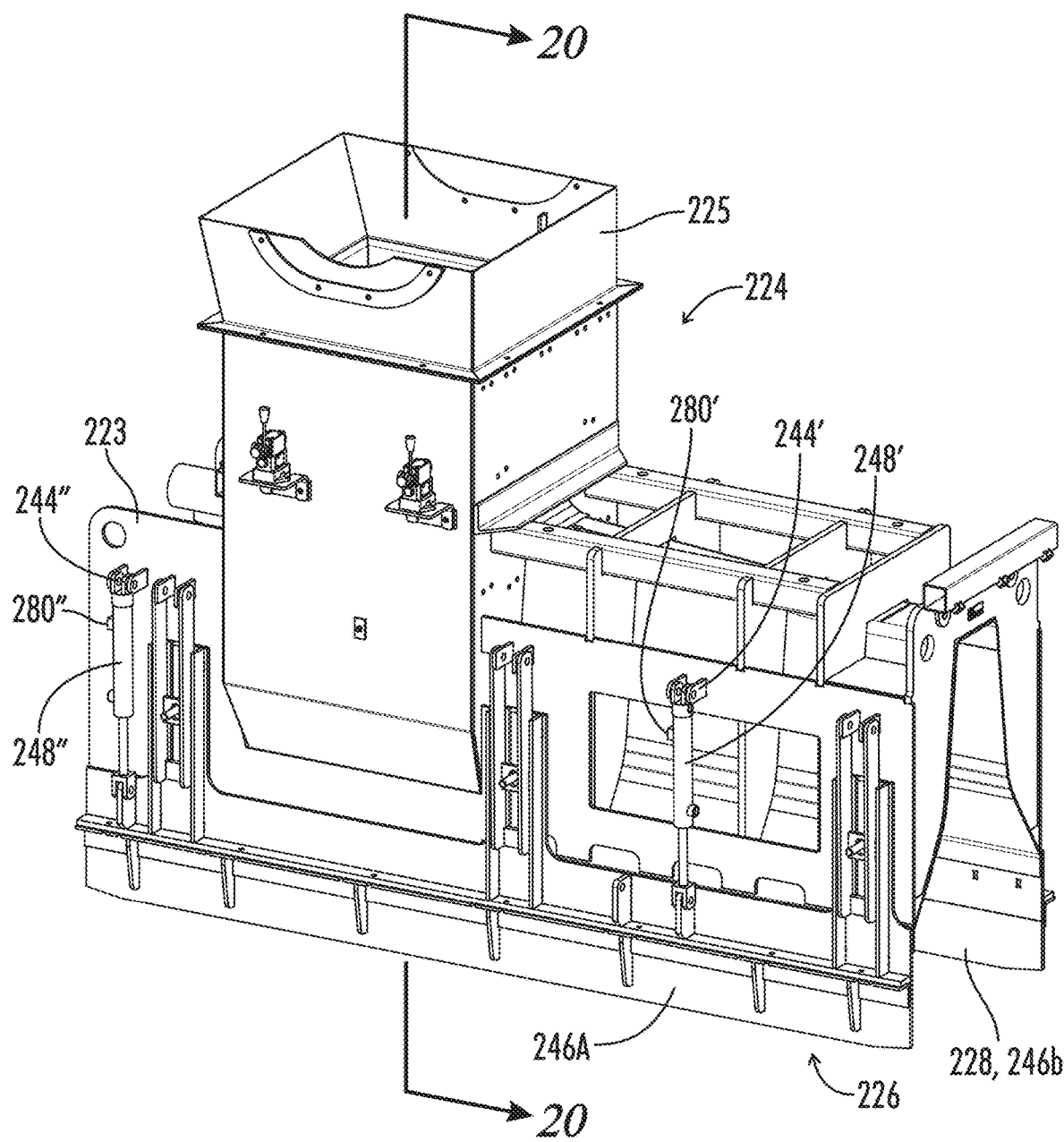
FIG. 19 is an upper left side perspective view of the offset slip form paver mold of the slip form paver apparatus of FIG. 18.
Figure 20:
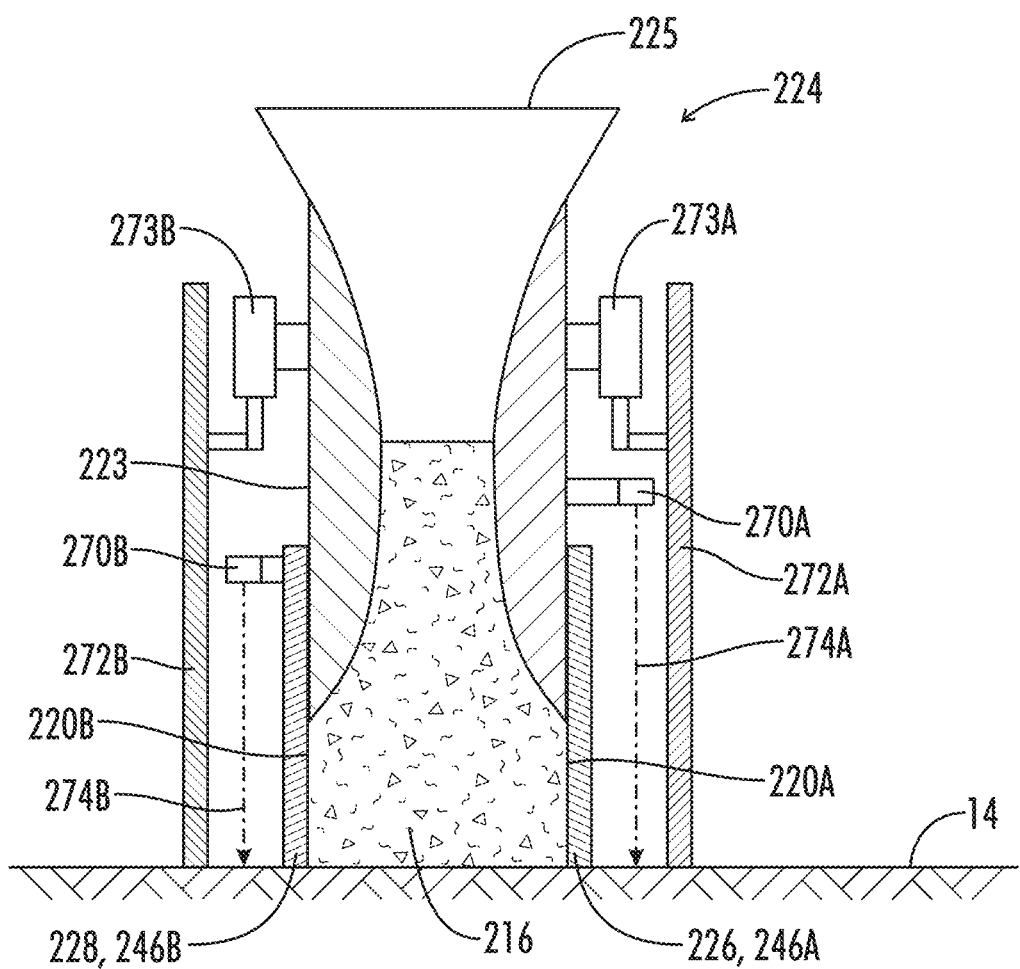
FIG. 20 is a schematic front elevation cross-section view of the offset slip form paver mold taken along line 20-20 of FIG. 19.

Offset Paver of FIGS. 18-20

FIG. 18 schematically shows a slip form paver apparatus 210 of the offset type. The apparatus 210 is configured to move across the ground surface and form a finished concrete structure 216 having a profile as schematically shown in FIG. 20. The profile terminates in lateral concrete sides 220A and 220B.

The slip form paver apparatus 210 includes a main frame 222 and an offset slip form paver mold 224 supported from the main frame 222. As schematically shown in FIG. 20 left and right side form assemblies 226 and 228 are connected to the slip form paver mold 224 to form at least a lower portion of the lateral concrete sides 220A and 220B on the finished concrete structure 216. As previously noted the references "left" and "right" are from the perspective of the operator of the machine 210 facing in a forward direction.

The main frame 222 is supported from the ground surface by a plurality of ground engaging units such as 230, which in the illustrated embodiment are tracked ground engaging units 230. Each of the ground engaging units 230 is connected to the main frame 222 by a lifting column such as 232 which is attached to a swing arm such as 234. An operator's platform 236 is located on the main frame 222. A conveyor 239 receives concrete mixture from a supply truck or the like (not shown) and conveys the mixture into the upper end of a hopper 225 of the offset slip form paver mold 224.

FIG. 19 is a left side perspective view of the offset slip form paver mold 224. There details of the left side form assembly 226 can be seen. The right side form assembly 228 is similarly constructed.

The left side form assembly 226 includes mounting brackets 244' and 244" attached to a main body 223 of the slip form paver mold 224. The mounting brackets 244' and 244" may also be referred to as mounting portions 244' and 244". The side form assembly 226 further includes a side form 246A supported from the brackets 244' and 244" via side form actuators 248' and 248", so that the side form 246A is vertically movable relative to the brackets 244' and 244" to engage the ground surface 14. The actuators 248' and 248" may have extension sensors 280' and 280" integrally provided therewith.

FIG. 20 is a schematic front cross-section elevation view taken along line 20-20 of FIG. 19 schematically showing the side form height sensors and outer shields similar to those previously described for the inset paving machine embodiment. Each of the left and right side form assemblies 226 and 228 has associated therewith a side form height sensor 270A or B, respectively, configured to detect directly or indirectly a height of the side form 246A or 246B relative to the ground surface.

In FIG. 20 the right side form assembly 228 is shown as having its side form height sensor 270B attached to the side form 246B so as to directly detect the height of the side form 246B relative to the ground surface.

The left side form assembly 226 is shown as having its side form height sensor 270A attached to the main body 223 of the mold 224 so as to indirectly detect the height of the side form 246A relative to the ground surface by combining information from the side form height sensor 270A with information from extension sensors associated with the actuators 248' and 248".

Outer shields 272A and 272B are supported from the offset mold 224 via hydraulic actuators 273A and 273B so as to shield the scanning beams 274A and 274B from the side form height sensors 270A and 270B, respectively.

The various sensors 270A, 270B, 280' and 280" and the various actuators 248' and 248" of the offset type of slip form paving machine 210 may be associated with the controller 82 of FIG. 17 in a manner similar to that previously described for the sensors and actuators of the inset type of slip form paving machine 10.

Methods of Operation

A method of operation of the slip form paper apparatus 10 may include the steps of:

(a) moving the slip form paver apparatus 10 in the paving direction 12 across the ground surface 14 and forming the finished concrete structure 16;

(b) receiving the input signal 84 from the at least one side form height sensor 70 in the controller 82, the input signal 84 corresponding to the height of the side form 46 relative to the ground surface 14; and (c) sending the control signal 86 from the controller 82 to the side form actuator 48 and thereby automatically controlling the height of the side form 46 relative to the ground surface 14 based at least in part on the input signal 84.

In one variation of the method the at least one side form height sensor 70 is fixed relative to the side form 46, and in step (b) the input signal 84 directly corresponds to the height of the side form 46 relative to the ground surface 14.

In another variation of the method the at least one side form height sensor 70 is fixed relative to the mounting panel 44 as schematically illustrated in FIG. 12 and in step (b) the input signal indirectly corresponds to the height of the side form 46 relative to the ground surface 14.

The method may further include steps of:

receiving in the controller 82 an input signal 88 from a side form extension sensor 80 corresponding to a distance between the side form 46 and the mounting panel 44; and wherein in step (c) the control signal is based at least in part on the input signal 88 from the side form extension sensor 80.

In another embodiment of the method the at least one side form height sensor 46 comprises a non-contact linear scanner 70 aligned in the paving direction 12, and in step (b) the input signal 84 from the non-contact linear scanner 70 corresponds to distances between the side form and a plurality of points on the ground surface 14.

The method may further include shielding the non-contact linear scanner 70 with the outer shield 82 spaced laterally outward from the side form 46 so that the non-contact linear scanner 70 is located laterally between the side form 46 and the outer shield 82, so that the non-contact linear scanner 70 scans the ground surface 14 between the side form 46 and the outer shield 82.

The method may further include:
adjusting the height of the side form 46 relative to the ground surface 14 to an initial height; and
wherein step (c) includes controlling the height of the side form 46 relative to the ground surface 14 to maintain the initial height.

The method may further include under control of the controller 82, automatically raising the side form 46 from a current height and then lowering the side form 46 back to the current height and thereby preventing concrete material from setting up between the mounting panel 44 and side form 46.

In another embodiment of the method:
the side form 46 includes at least first and second side form sections 46A and 46B aligned in the paving direction 12, and the side form actuator 48 includes first and second side form actuators 48A and 48B associated with the first and second side form sections 46A and 46B, respectively;
the at least one side form height sensor 70 is associated with the first side form section 46A;
the second side form actuator 48B includes an extension sensor 80 configured to detect a change in an extension distance of the second side form actuator 48B; and
wherein in step (b) the controller 82 receives input signals from the at least one side form height sensor 70 and the extension sensor 80 of the second side form actuator 48B; and
wherein in step (c) the control signal 86 is based at least in part on the input signals 84 and 88 from the at least one side form height sensor 70 and from the extension sensor 80 of the second side form actuator 48B.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A slip form paver apparatus configured to move in a paving direction across a ground surface for forming concrete into a finished concrete structure, the slip form paver apparatus comprising:
   a main frame;
   two front ground engaging units and two rear ground engaging units;
   two front lifting columns supporting the main frame from the two front ground engaging units, and two rear lifting columns supporting the main frame from the two rear ground engaging units;
   a slip form paver mold supported from the main frame behind the front ground engaging units and forward of the rear ground engaging units;
   at least one side form assembly configured to close the slip form paver mold on at least one side of the slip form paver mold, the at least one side form assembly including:
      a mounting portion supported from the main frame or from the slip form paver mold;
      a side form supported from the mounting portion and vertically movable relative to the mounting portion to engage the ground surface; and
      a side form actuator configured to move the side form up and down relative to the mounting portion to adjust a height of the side form relative to the ground surface;
   at least one side form height sensor configured to detect directly or indirectly the height of the side form relative the ground surface; and
   a controller configured to receive an input signal from the at least one side form height sensor, and to send a control signal based at least in part on the input signal to the side form actuator to control the height of the side form relative to the ground surface.

2. The slip form paver apparatus of claim 1, wherein:
the at least one side form height sensor comprises a probe element configured to engage the ground surface, the probe element being attached to the side form so that when the height of the side form relative to the ground surface is less than a predetermined minimum the probe element is deflected.

3. The slip form paver apparatus of claim 1, wherein:
the controller includes an operator interface configured such that a human operator can input a set point for the height of the side form relative to the ground surface.

4. The slip form paver apparatus of claim 1, wherein:
the at least one side form height sensor is fixed relative to the side form, such that the at least one side form height sensor is configured to directly detect the height of the side form relative to the ground surface.

5. The slip form paver apparatus of claim 1, wherein:
the at least one side form height sensor is fixed relative to the mounting portion, such that the at least one side form height sensor is configured to indirectly detect the height of the side form relative to the ground surface.

6. The slip form paver apparatus of claim 5, further comprising:
at least one side form extension sensor configured to detect a change in a distance between the side form and the mounting portion.

7. The slip form paver apparatus of claim 6, wherein:
the side form actuator is a hydraulic piston-cylinder unit; and
the at least one side form extension sensor is integrally formed in the hydraulic piston-cylinder unit of the side form actuator.

8. The slip form paver apparatus of claim 1, wherein:
the at least one side form height sensor comprises a non-contact linear scanner aligned in the paving direction and configured to detect distances between the side form and a plurality of points on the ground surface.

9. The slip form paver apparatus of claim 8, wherein:
the non-contact linear scanner is a laser scanner.

10. The slip form paver apparatus of claim 8, wherein:
the non-contact linear scanner includes a row of ultrasonic sensors.

11. The slip form paver apparatus of claim 8, further comprising:
an outer shield spaced laterally outwardly from the side form so that the non-contact linear scanner is located laterally between the side form and the outer shield, so that the non-contact linear scanner scans the ground surface between the side form and the outer shield.

12. The slip form paver apparatus of claim 11, wherein: the outer shield is configured to slide across the ground surface in a floating manner.

13. The slip form paver apparatus of claim 1, wherein:
the side form includes at least first and second side form sections aligned in the paving direction, and the side form actuator includes first and second side form actuators associated with the first and second side form sections, respectively;
the at least one side form height sensor is associated with the first side form section;
the at least one side form assembly includes an extension sensor configured to detect an extension distance of the second side form actuator; and
the controller is configured to receive input signals from the at least one side form height sensor and the extension sensor, and to determine based at least in part on the input signals a height of the second side form section relative to the ground surface.

14. The slip form paver apparatus of claim 1, wherein:
the side form includes at least first and second side form sections aligned in the paving direction, and the side form actuator includes first and second side form actuators associated with the first and second side form sections, respectively.

15. The slip form paver apparatus of claim 1, wherein:
the slip form paver apparatus is an inset slip form paver apparatus configured such that the finished concrete structure has a generally upwardly exposed concrete surface and terminates in lateral concrete sides; and
the at least one side form assembly is configured to form at least one of the lateral concrete sides on the finished concrete structure.

16. The slip form paver apparatus of claim 1, wherein:
the slip form paver apparatus is an offset slip form paver apparatus configured such that the finished concrete structure has a profile terminating in lateral concrete sides; and
the at least one side form assembly is configured to form at least a lower portion of one of the lateral concrete sides on the finished concrete structure.

17. A slip form paver apparatus configured to move in a paving direction across a ground surface for forming concrete into a finished concrete structure, the slip form paver apparatus comprising:
a main frame;
a slip form paver mold supported from the main frame;
at least one side form assembly configured to close the slip form paver mold on at least one side of the slip form paver mold, the at least one side form assembly including:
a mounting portion supported from the main frame or from the slip form paver mold;
a side form supported from the mounting portion and vertically movable relative to the mounting portion to engage the ground surface; and
a side form actuator configured to move the side form up and down relative to the mounting portion to adjust a height of the side form relative to the ground surface;
at least one side form height sensor configured to detect directly or indirectly the height of the side form relative the ground surface; and
a controller configured to receive an input signal from the at least one side form height sensor, and to send a control signal based at least in part on the input signal to the side form actuator to control the height of the side form relative to the ground surface;
wherein the controller includes a side form cycle mode configured such that the side form is automatically raised from and then lowered back to its previously controlled height relative to the ground surface so as to prevent concrete material from setting up against side form.

18. A slip form paver apparatus configured to move in a paving direction across a ground surface for forming concrete into a finished concrete structure, the slip form paver apparatus comprising:
a main frame;
a slip form paver mold supported from the main frame;
at least one side form assembly configured to close the slip form paver mold on at least one side of the slip form paver mold, the at least one side form assembly including:
a mounting portion supported from the main frame or from the slip form paver mold;
a side form supported from the mounting portion and vertically movable relative to the mounting portion to engage the ground surface; and
a side form actuator configured to move the side form up and down relative to the mounting portion to adjust a height of the side form relative to the ground surface;
at least one side form height sensor configured to detect directly or indirectly the height of the side form relative the ground surface; and
a controller configured to receive an input signal from the at least one side form height sensor, and to send a control signal based at least in part on the input signal to the side form actuator to control the height of the side form relative to the ground surface;
wherein the side form includes at least first and second side form sections aligned in the paving direction, and the side form actuator includes first and second side form actuators associated with the first and second side form sections, respectively; and
wherein the side form includes a third side form section aligned with the first and second side form sections, and the side form actuator includes a third side form actuator associated with the third side form section.

19. A method of operating a slip form paver apparatus, the slip form paver apparatus including:
a main frame;
two front ground engaging units and two rear ground engaging units;
two front lifting columns supporting the main frame from the two front ground engaging units, and two rear lifting columns supporting the main frame from the two rear ground engaging units;
a slip form paver mold supported from the main frame behind the front ground engaging units and forward of the rear ground engaging units;
at least one side form assembly closing the slip form paver mold on at least one side of the slip form paver mold, the at least one side form assembly including:
a mounting portion supported from the main frame or from the slip form paver mold;
a side form supported from the mounting portion and vertically movable relative to the mounting portion to engage the ground surface; and a side form actuator configured to move the side form up and down relative to the mounting portion to adjust a height of the side form relative to the ground surface; and at least one side form height sensor configured to detect directly or indirectly the height of the side form relative to the ground surface;

the method comprising steps of:

(a) moving the slip form paver apparatus in a paving direction across a ground surface and forming concrete into a finished concrete structure;

(b) receiving an input signal from the at least one side form height sensor in a controller, the input signal corresponding to the height of the side form relative to the ground surface; and (c) sending a control signal from the controller to the side form actuator and thereby automatically controlling the height of the side form relative to the ground surface based at least in part on the input signal.

20. The method of claim 19, wherein:

the side form includes at least first and second side form sections aligned in the paving direction, and the side form actuator includes first and second side form actuators associated with the first and second side form sections, respectively;

the at least one side form height sensor is associated with the first side form section;

the at least one side form assembly includes an extension sensor configured to detect a change in an extension distance of the second side form actuator; and wherein in step (b) the controller receives input signals from the at least one side form height sensor and the extension sensor; and wherein in step (c) the control signal is based at least in part on the input signals from the at least one side form height sensor and the extension sensor.

21. The method of claim 19, wherein:

the at least one side form height sensor is fixed relative to the side form; and in step (b) the input signal directly corresponds to the height of the side form relative to the ground surface.

22. The method of claim 19, wherein:

the at least one side form height sensor is fixed relative to the mounting portion; and in step (b) the input signal indirectly corresponds to the height of the side form relative to the ground surface.

23. The method of claim 22, further comprising:

receiving in the controller an input signal from a side form extension sensor corresponding to a distance between the side form and the mounting portion; and wherein in step (c) the control signal is based at least in part on the input signal from the side form extension sensor.

24. The method of claim 19, wherein:

the at least one side form height sensor comprises a non-contact linear scanner aligned in the paving direction; and in step (b) the input signal from the non-contact linear scanner corresponds to distances between the side form and a plurality of points on the ground surface.

25. The method of claim 24, further comprising:

shielding the non-contact linear scanner with an outer shield spaced laterally outward from the side form so that the non-contact linear scanner is located laterally between the side form and the outer shield, so that the non-contact linear scanner scans the ground surface between the side form and the outer shield.

26. The method of claim 19, further comprising:

adjusting the height of the side form relative to the ground surface to an initial height; and wherein step (c) includes controlling the height of the side form relative to the ground surface to maintain the initial height.

27. A method of operating a slip form paver apparatus, the slip form paver apparatus including:

a main frame;

a slip form paver mold supported from the main frame;

at least one side form assembly closing the slip form paver mold on at least one side of the slip form paver mold, the at least one side form assembly including:

a mounting portion supported from the main frame or from the slip form paver mold;

a side form supported from the mounting portion and vertically movable relative to the mounting portion to engage the ground surface; and a side form actuator configured to move the side form up and down relative to the mounting portion to adjust a height of the side form relative to the ground surface; and at least one side form height sensor configured to detect directly or indirectly the height of the side form relative to the ground surface;

the method comprising steps of:

moving the slip form paver apparatus in a paving direction across a ground surface and forming concrete into a finished concrete structure;

receiving an input signal from the at least one side form height sensor in a controller, the input signal corresponding to the height of the side form relative to the ground surface;

sending a control signal from the controller to the side form actuator and thereby automatically controlling the height of the side form relative to the ground surface based at least in part on the input signal; and under control of the controller, automatically raising the side form from a current height and then lowering the side form back to the current height and thereby preventing concrete material from setting up against the side form.

* * * * *